United States Patent
Uchitani et al.

(10) Patent No.: US 9,531,222 B2
(45) Date of Patent: Dec. 27, 2016

(54) STATOR CORE HAVING CONVEX PROTRUDING PORTION COINCIDING WITH ADJACENT COILS

(75) Inventors: Yoshihiro Uchitani, Kyoto (JP); Yuji Tanaka, Kyoto (JP); Tomoyoshi Yokogawa, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 370 days.

(21) Appl. No.: 14/344,400

(22) PCT Filed: Sep. 14, 2012

(86) PCT No.: PCT/JP2012/005879
§ 371 (c)(1),
(2), (4) Date: Mar. 12, 2014

(87) PCT Pub. No.: WO2013/042341
PCT Pub. Date: Mar. 28, 2013

(65) Prior Publication Data
US 2014/0346918 A1    Nov. 27, 2014

(30) Foreign Application Priority Data

Sep. 19, 2011  (JP) .................................. 2011-203922

(51) Int. Cl.
*H02K 1/16* (2006.01)
*H02K 1/14* (2006.01)
(Continued)

(52) U.S. Cl.
CPC .............. *H02K 1/165* (2013.01); *H02K 1/148* (2013.01); *H02K 3/12* (2013.01); *H02K 3/345* (2013.01);
(Continued)

(58) Field of Classification Search
CPC ..................................................... H02K 1/148
(Continued)

(56) References Cited

U.S. PATENT DOCUMENTS

| 6,975,057 B2* | 12/2005 | Gauthier | ............... H02K 1/141 |
| | | | 310/215 |
| 2005/0067912 A1* | 3/2005 | Murakami | ............. H02K 1/148 |
| | | | 310/216.043 |

(Continued)

FOREIGN PATENT DOCUMENTS

| EP | 0 414 507 A1 | 2/1991 |
| EP | 0 871 282 A1 | 10/1998 |

(Continued)

OTHER PUBLICATIONS

Official Communication issued in International Patent Application No. PCT/JP2012/005879, mailed on Dec. 18, 2012.

*Primary Examiner* — Naishadh Desai
(74) *Attorney, Agent, or Firm* — Keating & Bennett, LLP (57) ABSTRACT

A stationary portion of a motor includes a stator core, insulators, and coils. The stator core includes a core back having an annular shape, and a plurality of teeth extending radially inward from the core back. A radially inner end portion of each tooth has a circumferential width substantially equal to or smaller than a circumferential width of a remaining portion of the tooth. The core back includes a protruding portion protruding radially inward between adjacent teeth, a cut extending radially outward from the protruding portion, and a through hole extending in an axial direction through the core back defined at a radially outer end portion of the cut. The protruding portion increases a radial dimension of the core back to achieve a reduction in magnetic reluctance in the vicinity of the cut.

17 Claims, 8 Drawing Sheets

(51) Int. Cl.
*H02K 15/02* (2006.01)
*H02K 3/12* (2006.01)
*H02K 3/34* (2006.01)
*H02K 15/10* (2006.01)

(52) U.S. Cl.
CPC .......... *H02K 15/022* (2013.01); *H02K 15/105* (2013.01); *Y10T 29/49012* (2015.01)

(58) Field of Classification Search
USPC .... 310/216.008, 216.019, 216.043, 216.044, 310/216.048, 216.051, 216.109, 216.111
See application file for complete search history.

(56) References Cited

U.S. PATENT DOCUMENTS

2007/0096587 A1* 5/2007 Ionel .................. H02K 1/148
310/216.009
2010/0090560 A1* 4/2010 Myojin ................ H02K 1/148
310/216.043

FOREIGN PATENT DOCUMENTS

| | | |
|---|---|---|
| JP | 09-191588 A | 7/1997 |
| JP | 11-069738 A | 3/1999 |
| JP | 11-299134 A | 10/1999 |
| JP | 2000-014057 A | 1/2000 |
| JP | 2006-340509 A | 12/2006 |
| JP | 2008-228434 A | 9/2008 |
| JP | 2008-306816 A | 12/2008 |
| JP | 2010-11706 A | 1/2010 |
| JP | 2010-193715 A | 9/2010 |
| JP | 2010-252611 A | 11/2010 |
| JP | 2011-024352 A | 2/2011 |

* cited by examiner

STATOR CORE HAVING CONVEX PROTRUDING PORTION COINCIDING WITH ADJACENT COILS

BACKGROUND OF THE INVENTION

1. Field of the Invention

The present invention relates to a motor and a method of manufacturing the motor.

2. Description of the Related Art

There is a known method in which a straight core defined by laminated steel sheets is bent into an annular shape to define a stator core of a motor. A known motor in which such a straight core is used is described, for example, in JP-A H11-069738. A technique of bending laminated punched-out plates into an annular shape to define a stator core is described in JP-A H11-069738 (see paragraph [0003] of JP-A H11-069738). In addition, JP-A H11-069738 notes that a folding portion including a V-shaped cut is defined in a portion of a back yoke between adjacent teeth (see paragraphs [0016], [0026], and [0031] of JP-A H11-069738).

The aforementioned structure described in JP-A H11-069738 has a problem in that magnetic reluctance is increased in each folding portion including the cut. Moreover, as illustrated in the accompanying drawings of JP-A H11-069738, a through hole having a substantially circular shape in a plan view is defined at a tip portion of the cut in the straight core in order to reduce resistance when the straight core is bent into the annular shape. The through hole remains as an opening even after the straight core is bent into the annular shape to define a stator core. This opening causes an additional increase in the magnetic reluctance in the folding portion. As a result, magnetic flux may be disturbed between the adjacent teeth.

SUMMARY OF THE INVENTION

Preferred embodiments of the present invention provide a technique that significantly reduces or prevents an increase in magnetic reluctance of a core back of a motor including a stator core defined by bending a straight core into an annular shape.

A motor according to a preferred embodiment of the present invention includes a stationary portion and a rotating portion. The rotating portion is supported to be rotatable about a central axis with respect to the stationary portion. The stationary portion includes a stator core, insulators, and coils. The stator core includes a core back bent into an annular shape and a plurality of teeth arranged to extend radially inward from the core back. Each insulator is attached to a separate one of the teeth. Each coil is defined by a conducting wire wound around a separate one of the insulators. A radially inner end portion of each tooth is arranged to have a circumferential width substantially equal to or smaller than a circumferential width of a remaining portion of the tooth. The core back includes a protruding portion, a cut, and a through hole between adjacent ones of the teeth. The protruding portion is arranged to protrude radially inward. The cut is arranged to extend radially outward from the protruding portion. The through hole is arranged to extend in an axial direction through the core back, and is defined at a radially outer end portion of the cut. The protruding portion is arranged to locally increase a radial dimension of the core back.

According to the above-described preferred embodiment of the present invention, it is possible to reduce an increase in magnetic reluctance of the core back in the vicinity of the cut.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the accompanying drawings.

General Preferred Embodiment

Figure 1:
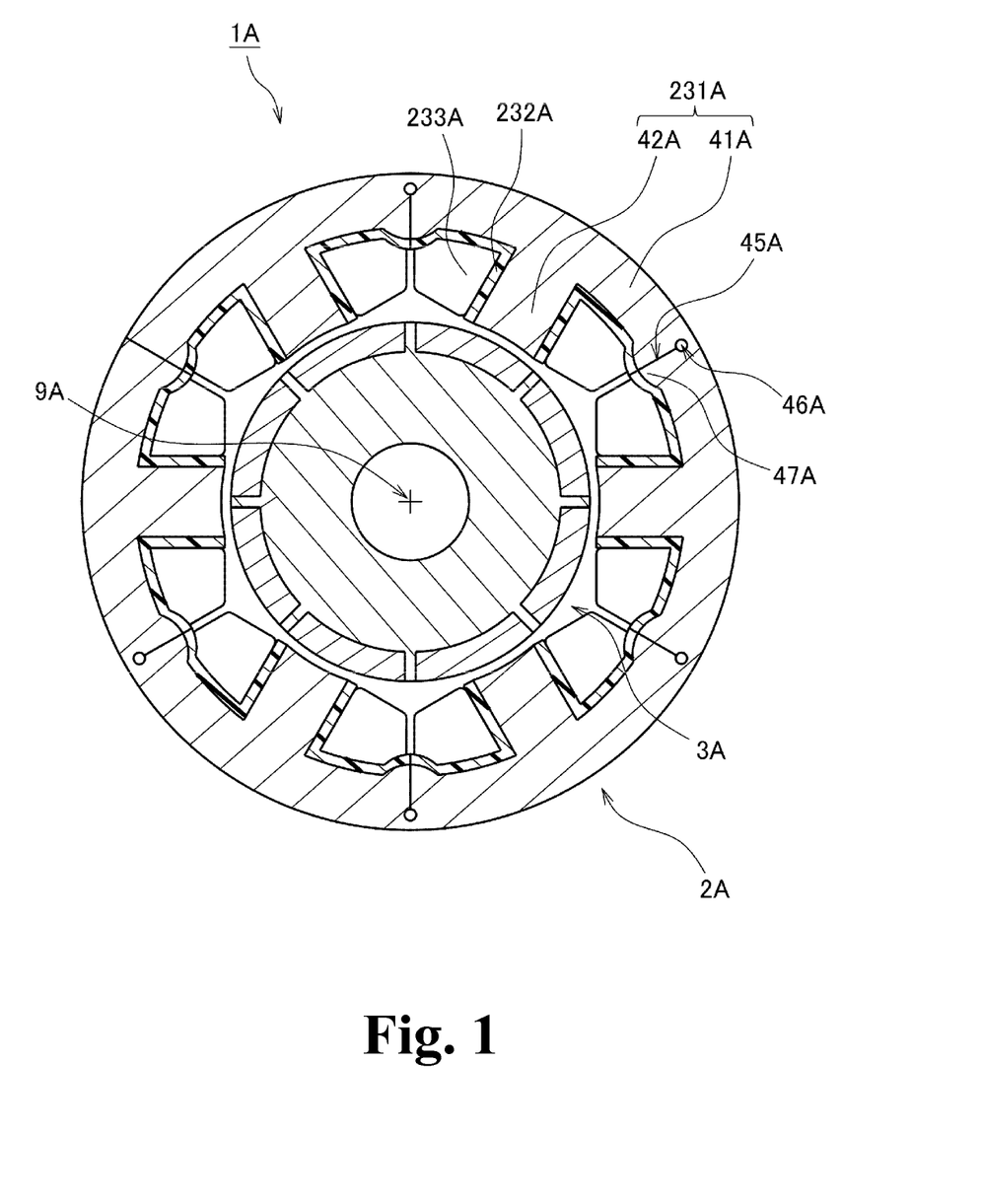
FIG. 1 is a horizontal cross-sectional view of a motor according to a preferred embodiment of the present invention.

FIG. 1 is a horizontal cross-sectional view of a motor 1A according to a preferred embodiment of the present invention taken along a plane perpendicular to a central axis 9A. As illustrated in FIG. 1, the motor 1A includes a stationary portion 2A and a rotating portion 3A. The rotating portion 3A is supported to be rotatable about the central axis 9A with respect to the stationary portion 2A.

The stationary portion 2A preferably includes a stator core 231A, insulators 232A, and coils 233A. The stator core 231A includes a core back 41A bent into an annular shape, and a plurality of teeth 42A arranged to extend radially inward from the core back 41A. A radially inner end portion of each tooth 42A preferably has a circumferential width substantially equal to or smaller than the circumferential width of a remaining portion of the tooth 42A. Each insulator 232A is attached to a separate one of the teeth 42A. Each coil 233A is preferably defined by a conducting wire wound around a separate one of the insulators 232A.

The core back 41A preferably includes a plurality of protruding portions 47A each of which protrudes radially inward. Each protruding portion 47A is arranged between a separate pair of adjacent ones of the teeth 42A. In addition, the core back 41A preferably includes a plurality of cuts 45A each of which is arranged to extend radially outward from a separate one of the protruding portions 47A. Moreover, a through hole 46A is preferably defined at a radially outer end portion of each cut 45A. Each through hole 46A is arranged to extend in an axial direction through the core back 41A.

In this motor 1A, each protruding portion 47A is arranged to locally increase the radial dimension of the core back 41A. This contributes to reducing an increase in magnetic reluctance in a portion of the core back 41A in the vicinity of each cut 45A.

More Specific Preferred Embodiment

Next, a more specific preferred embodiment of the present invention will now be described below. It is assumed herein that a vertical direction is defined as a direction in which a central axis 9 of a motor 1 extends, and the shape of each member or portion and relative positions of different members or portions will be described based on this assumption. It should be noted, however, that the above definition of the vertical direction is made simply for the sake of convenience in description, and should not be construed to restrict in any way the orientation of a motor according to any preferred embodiment of the present invention when in actual use.

The motor 1 according to the present preferred embodiment is preferably, for example, installed in an automobile and used to generate a driving force of a power steering system. Note, however, that motors according to other preferred embodiments of the present invention may be used for other purposes. For example, a motor according to a preferred embodiment of the present invention may alternatively be used as a driving source of another component of the automobile, e.g., an engine cooling fan. Also, motors according to preferred embodiments of the present invention may be installed in household electrical appliances, office automation appliances, medical appliances, and so on, and used to generate a variety of driving forces.

Figure 2:
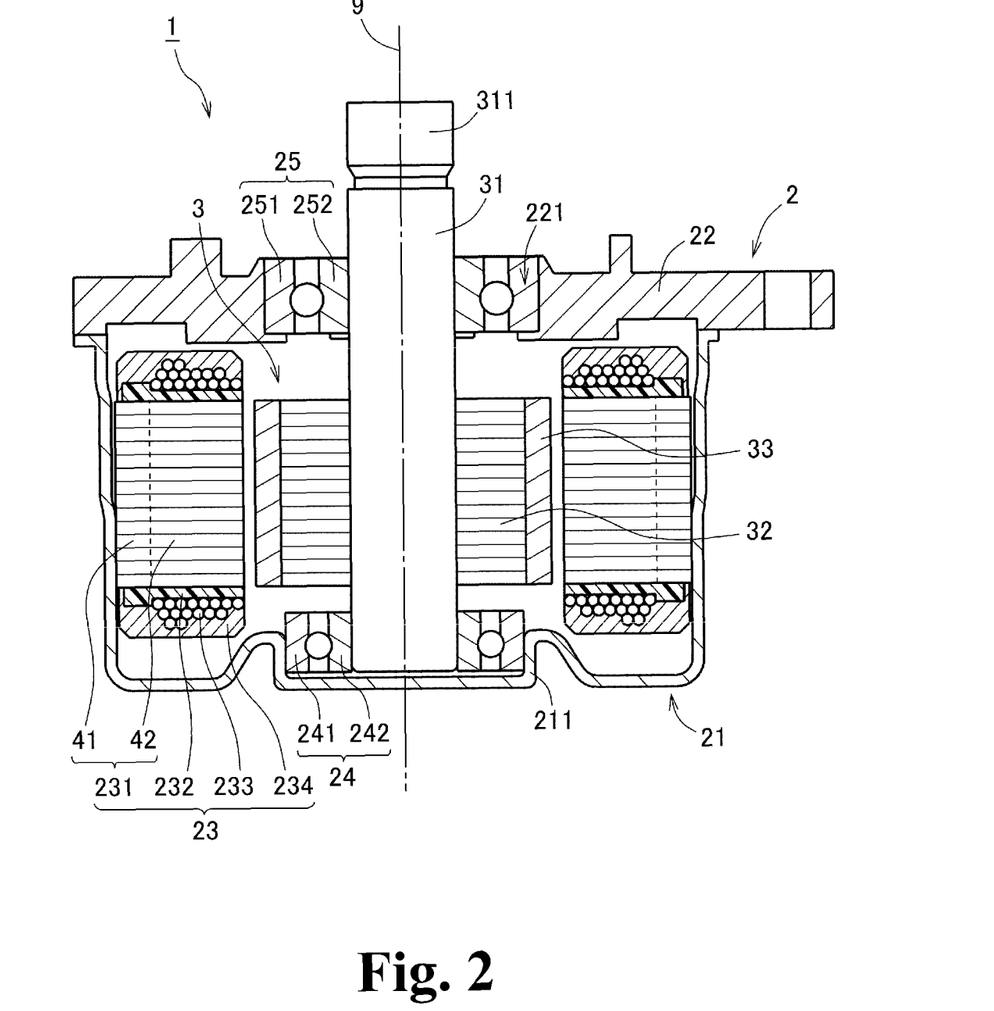
FIG. 2 is a vertical cross-sectional view of a motor according to a preferred embodiment of the present invention.

FIG. 2 is a vertical cross-sectional view of the motor 1 according to the present preferred embodiment. As illustrated in FIG. 2, the motor 1 includes a stationary portion 2 and a rotating portion 3. The stationary portion 2 is preferably fixed to a frame of an apparatus for which the motor 1 is to be driven. The rotating portion 3 is supported to be rotatable with respect to the stationary portion 2.

The stationary portion 2 according to the present preferred embodiment preferably includes a housing 21, a lid portion 22, a stator unit 23, a lower bearing portion 24, and an upper bearing portion 25.

The housing 21 is preferably a case arranged in or substantially in the shape of a cylinder with a bottom. The lid portion 22 is preferably arranged in or substantially in the shape of a plate, and is arranged to cover an upper opening of the housing 21. The stator unit 23, the lower bearing portion 24, a rotor core 32, and a plurality of magnets 33 are accommodated in an interior space enclosed by the housing 21 and the lid portion 22. The rotor core 32 and the magnets 33 will be described below. A bottom surface of the housing 21 preferably includes a recessed portion 211 defined in a center thereof. The recessed portion 211 is arranged to hold the lower bearing portion 24. The lid portion 22 preferably includes a circular hole 221 defined in a center thereof. The circular hole 221 is arranged to hold the upper bearing portion 25.

The stator unit 23 is arranged to function as an armature to generate magnetic flux in accordance with drive currents. The stator unit 23 preferably includes a stator core 231, insulators 232, coils 233, and resin bodies 234.

Figure 3:
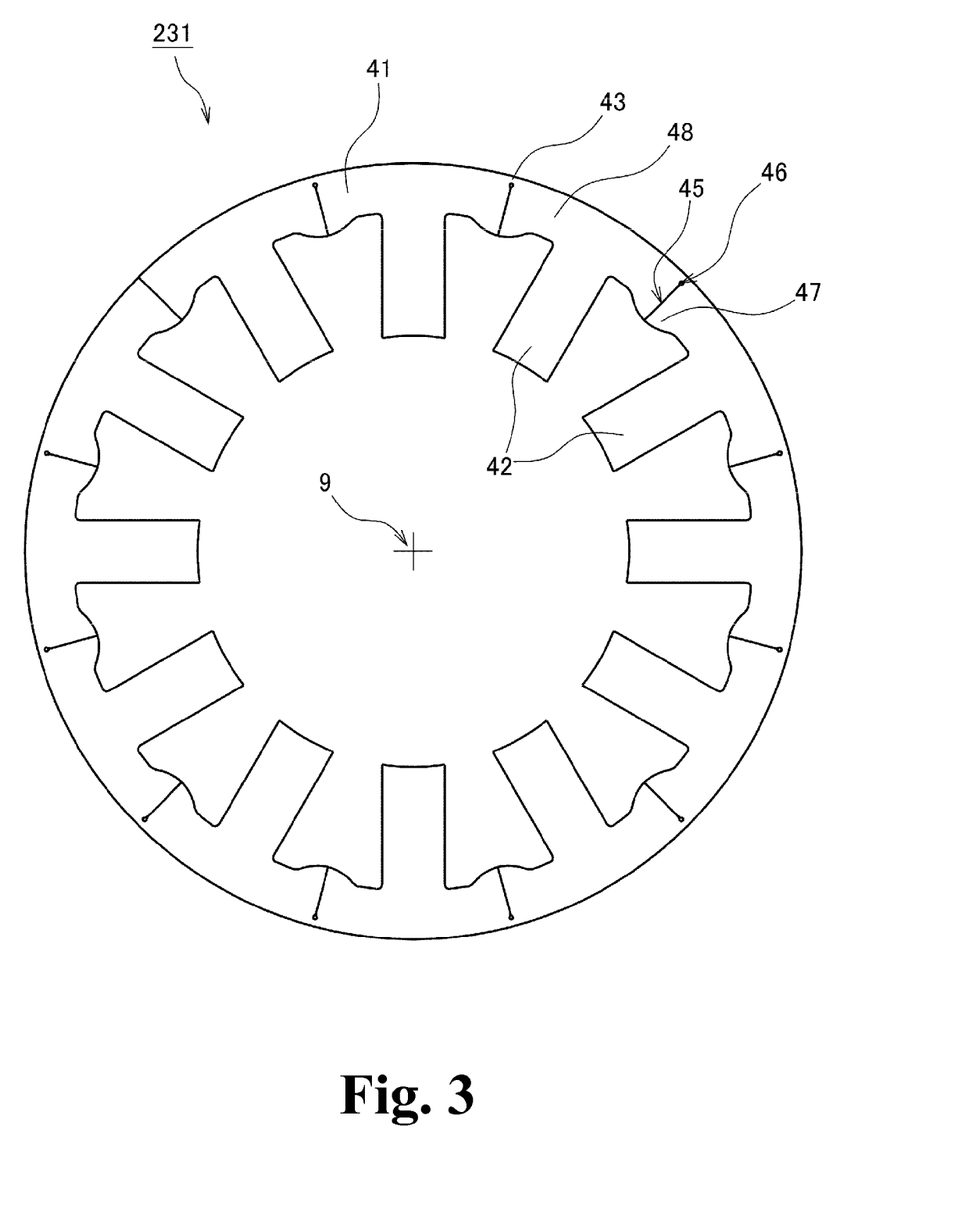
FIG. 3 is a top view of a stator core according to a preferred embodiment of the present invention.

FIG. 3 is a top view of the stator core 231. As illustrated in FIG. 3, the stator core 231 includes an annular core back 41 and a plurality of teeth 42 arranged to project radially inward (i.e., inward in directions perpendicular to the central axis 9) from the core back 41. The directions perpendicular to the central axis 9 will hereinafter be referred to by the term "radial direction", "radial", or "radially". The teeth 42 are preferably arranged at regular or substantially regular intervals in a circumferential direction. As illustrated in FIG. 2, the core back 41 is fixed to an inner circumferential surface of a side wall of the housing 21. The stator core 231 is preferably, for example, defined by laminated steel sheets, i.e., a plurality of electromagnetic steel sheets placed one upon another in an axial direction (i.e., a direction parallel to the central axis 9). The direction parallel to the central axis 9 will hereinafter be referred to by the term "axial direction", "axial", or "axially".

Each insulator 232 is preferably made of a resin, and is arranged between a corresponding one of the teeth 42 and a corresponding one of the coils 233. Each insulator 232 according to the present preferred embodiment is arranged to extend in a radial direction in a tubular or substantially tubular shape. Each insulator 232 is preferably attached to the corresponding tooth 42 such that the insulator 232 covers an entire surface of the tooth 42 except for a radially inner end surface of the tooth 42, that is, such that the insulator 232 covers an upper surface, a lower surface, and two side surfaces of the tooth 42. Each coil 233 is defined by a conducting wire wound around a separate one of the insulators 232 such that the conducting wire covers an upper surface, a lower surface, and two side surfaces of the insulator 232.

Each resin body 234 is preferably defined around a separate one of the teeth 42 by an insert molding process. Each resin body 234 is arranged to cover a corresponding one of the teeth 42, a corresponding one of the insulators 232, and a corresponding one of the coils 233 except for the radially inner end surface of the tooth 42.

The lower and upper bearing portions 24 and 25 are arranged to rotatably support a shaft 31 of the rotating portion 3. A ball bearing which causes an outer race and an inner race to rotate relative to each other through balls is preferably used as each of the lower and upper bearing portions 24 and 25 according to the present preferred embodiment. However, note that other types of bearings, such as plain bearings, fluid bearings, or the like, may be used in place of the ball bearings in other preferred embodiments of the present invention.

An outer race 241 of the lower bearing portion 24 is fixed to the recessed portion 211 of the housing 21. An outer race 251 of the upper bearing portion 25 is fixed to both an inner circumferential surface of the lid portion 22 which defines the circular hole 221, and an edge portion arranged to project radially inward from the inner circumferential surface of the lid portion 22. Meanwhile, inner races 242 and 252 of the lower and upper bearing portions 24 and 25, respectively, are both preferably fixed to the shaft 31. The shaft 31 is thus supported to be rotatable with respect to the housing 21 and the lid portion 22.

The rotating portion 3 according to the present preferred embodiment includes the shaft 31, the rotor core 32, and the magnets 33.

The shaft 31 is preferably arranged in or substantially in the shape of a round column, and is arranged to extend in a vertical direction along the central axis 9. The shaft 31 is arranged to rotate about the central axis 9 while being supported by the lower and upper bearing portions 24 and 25 described above. The shaft 31 preferably includes a head portion 311 arranged to project through and above the lid portion 22. The head portion 311 is preferably connected to, for example, the power steering of the automobile or the like through a power transmission mechanism, such as a gear.

The rotor core 32 and the magnets 33 are preferably arranged radially inward of the stator unit 23, and are arranged to rotate together with the shaft 31. The rotor core 32 is preferably arranged in or substantially in the shape of a hollow cylinder, and is fixed to the shaft 31. Each of the magnets 33 is fixed to an outer circumferential surface of the rotor core 32 through, for example, an adhesive. A radially outer surface of each magnet 33 defines a pole surface to be opposed to the radially inner end surface of each tooth 42. The magnets 33 are arranged at regular or substantially regular intervals in the circumferential direction such that north and south pole surfaces alternate with each other.

Note that a single annular magnet in which north and south poles are alternately arranged in the circumferential direction may be used in place of the magnets 33, if so desired.

In the motor 1 as described above, once the drive currents are supplied to the coils 233 of the stationary portion 2, radial magnetic flux is generated around each of the teeth 42 of the stator core 231. Then, a circumferential torque is produced by interaction between the magnetic flux of the teeth 42 and that of the magnets 33, so that the rotating portion 3 is caused to rotate about the central axis 9 with respect to the stationary portion 2.

Next, a more detailed structure of the above-described stator unit 23 will now be described below.

Figure 4:
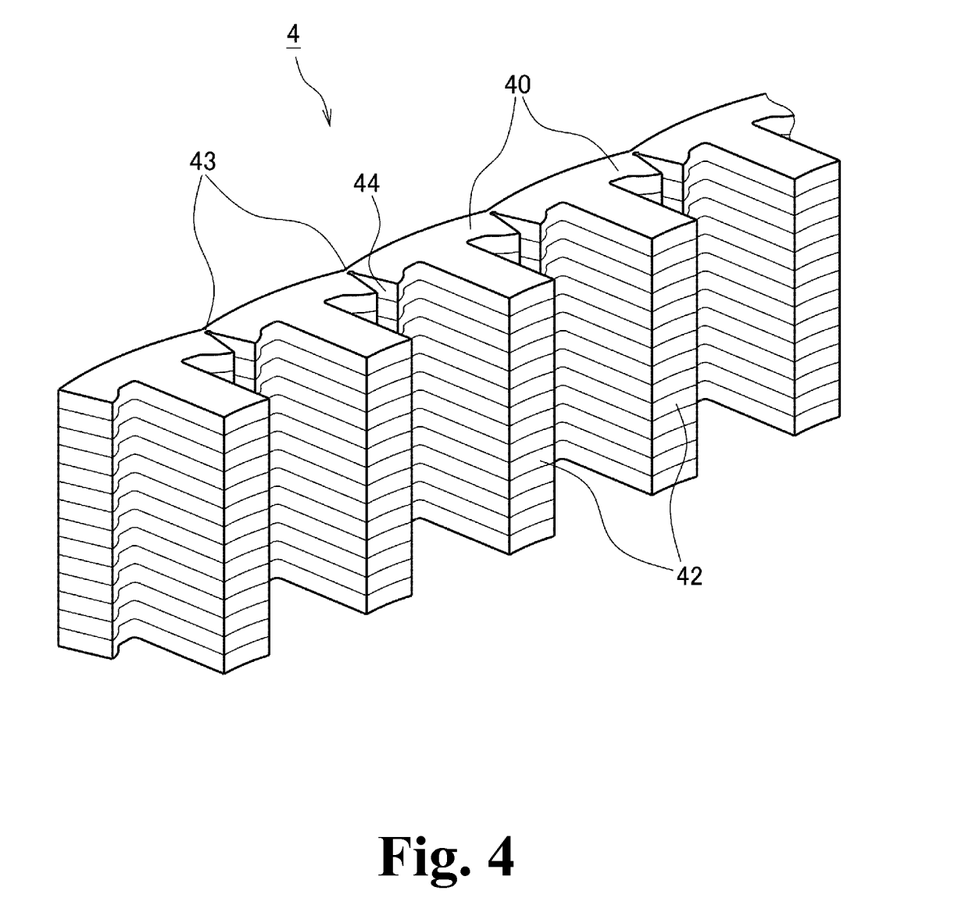
FIG. 4 is a partial perspective view of a straight core according to a preferred embodiment of the present invention.

FIG. 4 is a partial perspective view of a so-called straight core 4, which is the stator core 231 in an expanded state. The stator core 231 according to the present preferred embodiment is preferably obtained, for example, by bending the straight core 4 illustrated in FIG. 4 into an annular shape. As illustrated in FIG. 4, the core back 41 of the stator core 231 is preferably divided into a plurality of core pieces 40 each of which is arranged for a separate one of the teeth 42. The core pieces 40 are connected with one another through flexible joint portions 43 to assume the shape of a band. When the stator core 231 is manufactured, the joint portions 43 of the straight core 4 as described above are deformed to bring end surfaces 44 of each pair of adjacent ones of the core pieces 40 into contact with each other. As a result, the annular core back 41 is defined.

Figure 5:
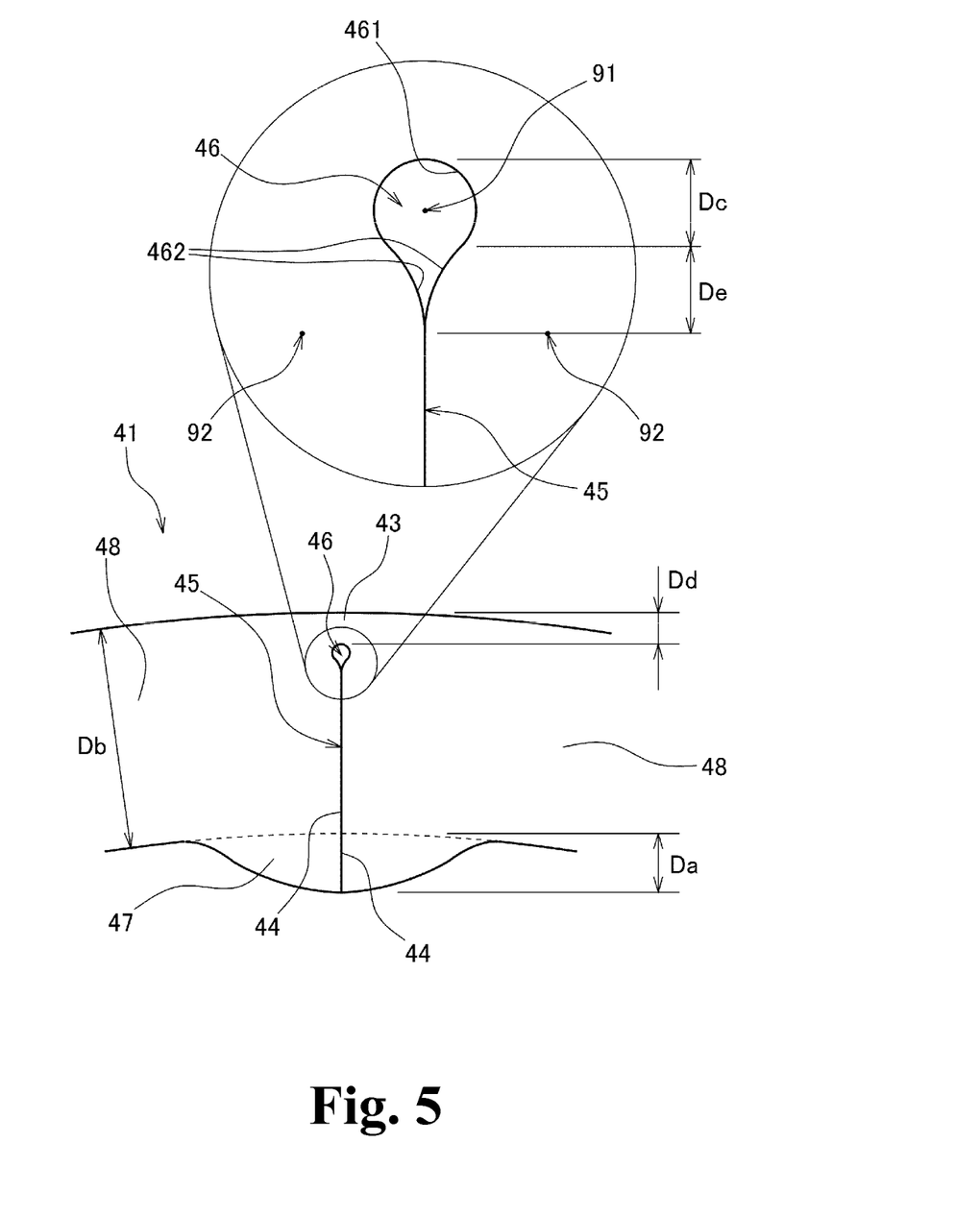
FIG. 5 is a partial top view of a core back according to a preferred embodiment of the present invention.

FIG. 5 is a partial top view of the core back 41 of the stator core 231. As illustrated in FIG. 5, a cut 45 is preferably defined between adjacent ones of the core pieces 40. The end surfaces 44 of the adjacent core pieces 40 are preferably in contact with each other at the cut 45. The cut 45 is arranged between adjacent ones of the teeth 42, and is arranged to extend radially outward from an inner circumferential surface of the core back 41.

A through hole 46 extending in an axial direction through the core back 41 is preferably defined at a radially outer end portion of each cut 45. In addition, the joint portion 43, which is arranged to join adjacent ones of the core pieces 40 to each other in the circumferential direction, is arranged on a radially outer side of the through hole 46. Each through hole 46 improves flexibility of the joint portion 43 adjacent thereto, thus making it easier to bend the straight core 4 into the annular shape. A radially inner portion of an inner circumferential surface of the through hole 46 is preferably defined by a pair of second curved surfaces 462. Each second curved surface 462 is arranged to have a center of curvature outside of the through hole 46, that is, is arranged to be rounded inward toward an interior of the through hole 46. The second curved surfaces 462 contribute to reducing variations in the degree of adhesion between the end surfaces 44 of the core pieces 40 when the straight core 4 has been bent into the annular shape. If the through hole 46 were not provided with the second curved surfaces 462, a dimensional variation of an area where the through hole 46 and the end surfaces 44 meet would significantly affect the degree of adhesion between the entire end surfaces 44. Even a slight protrusion due to a processing error might cause a gap between the entire end surfaces 44. In order to avoid this, it would be necessary to strictly manage processing tolerances of the core pieces 40, but that would raise a production cost. This problem could be solved to some extent by defining chamfers in the aforementioned area, but that would mean an increased size of the through hole 46, and would lead to increased magnetic reluctance. By providing the second curved surfaces 462 in the through hole 46, it is possible to produce a beneficial effect of reducing the magnetic reluctance by enabling stable adhesion between the end surfaces 44, while avoiding an increase in the magnetic reluctance which would accompany an unwanted increase in the size of the through hole 46.

The core back 41 is preferably discontinuous in the circumferential direction at each cut 45 and at each through hole 46. Therefore, each of the cuts 45 and the through holes 46 has a greater magnetic reluctance per unit area than that of any other portion of the core back 41. In particular, each through hole 46 remains as an opening even after the straight core 4 is bent into the annular shape, and is thus accordingly more highly resistant to the magnetic flux. Moreover, each joint portion 43 has a greater magnetic reluctance per unit area than that of the laminated steel sheets in a natural state, because the joint portion 43 has been subjected to plastic working.

In view of the above considerations, the core back 41 according to the present preferred embodiment is preferably provided with a plurality of protruding portions 47. Each protruding portion 47 is arranged to protrude radially inward in a convex shape between a separate pair of adjacent ones of the teeth 42. As illustrated in FIGS. 3 and 5, the protruding portion 47 is arranged to extend across both adjacent core pieces 40 in the vicinity of the cut 45. That is, the cut 45 is arranged to extend radially outward from a surface of the protruding portion 47. Moreover, the core back 41 preferably includes a circular arc portion 48 between each protruding portion 47 and each of the teeth 42 adjacent thereto. Each circular arc portion 48 does not include a radially inward protrusion.

Each protruding portion 47 is arranged to locally increase the radial dimension of the core back 41. The area of each end surface 44 of each core piece 40 is thus increased compared to the case where no protruding portions 47 are provided. A magnetic path in the vicinity of each cut 45 is thus expanded, resulting in a reduction in circumferential magnetic reluctance of the core back 41. This makes it easier for the magnetic flux to flow in the circumferential direction between the adjacent teeth 42.

The protruding portion 47 is preferably arranged to locally increase the radial dimension of the core back 41 by a distance equal to or greater than the radial dimension of the through hole 46. In other words, a portion of the core back 41 which coincides with the through hole 46 when viewed in the radial direction preferably has a total radial dimension equal to or greater than the radial dimension of the circular arc portion 48, the total radial dimension not including the radial dimension of the through hole 46. In this case, a reduction in the magnetic path owing to the through hole 46 is compensated by the protruding portion 47.

As illustrated in FIG. 5 in an enlarged form, the inner circumferential surface of each through hole 46 according to the present preferred embodiment is preferably defined by a first curved surface 461 and the pair of second curved surfaces 462, which are arranged radially inward of the first curved surface 461. Each of the first curved surface 461 and the pair of second curved surfaces 462 is arranged to have a shape of a circular or substantially circular arc in a plan view. In addition, the first curved surface 461 and each of the second curved surfaces 462 are arranged to be smoothly continuous with each other. The first curved surface 461 is preferably arranged to have a center of curvature 91 in the through hole 46. Meanwhile, each of the second curved surfaces 462 is preferably arranged to have a center of curvature 92 outside of the through hole 46.

A maximum circumferential width of a portion of the through hole 46 which is encircled by the first curved surface 461 is greater than a maximum circumferential width of a portion of the through hole 46 which is located between the second curved surfaces 462. Therefore, circumferential magnetic reluctance of the through hole 46 is particularly high in the portion of the through hole 46 which is encircled by the first curved surface 461. Accordingly, the radial dimension of the protruding portion 47 is preferably equal to or greater than the radial dimension of the first curved surface 461. This preferred condition is expressed in mathematical terms as follows: $Dc \leq Da$, where Da is the radial dimension of the protruding portion 47 (i.e., a difference between the radial distance from the central axis 9 to an inner circumferential surface of each circular arc portion 48 and the radial distance from the central axis 9 to a radially inner end portion of each protruding portion 47), and Dc is the radial dimension of the first curved surface 461 (i.e., a difference between the radial distance from the central axis 9 to a radially outer end portion of each first curved surface 461 and the radial distance from the central axis 9 to a boundary between the first and second curved surfaces 461 and 462). When this condition holds, an increase in the magnetic reluctance owing to the portion of the through hole 46 which is encircled by the first curved surface 461 is compensated by the protruding portion 47.

Further, the radial dimension Da of the protruding portion 47 is more preferably equal to or greater than the sum of the radial dimension Dc of the first curved surface 461 and the radial dimension of the joint portion 43. This more preferred condition is expressed in mathematical terms as follows: $Dc + Dd \leq Da$, where Dd is the radial dimension of the joint portion 43 (i.e., the radial distance from the radially outer end portion of each first curved surface 461 to an outer circumferential surface of the core back 41). When this condition holds, an increase in the magnetic reluctance owing to a combination of the joint portion 43 and the portion of the through hole 46 which is encircled by the first curved surface 461 is compensated by the protruding portion 47.

Furthermore, the radial dimension Da of the protruding portion 47 is more preferably equal to or greater than the sum of the radial dimension Dc of the first curved surface 461, the radial dimension Dd of the joint portion 43, and the radial dimension of each second curved surface 462. This more preferred condition is expressed in mathematical terms as follows: $Dc + Dd + De \leq Da$, where De is the radial dimension of each second curved surface 462 (i.e., a difference between the radial distance from the central axis 9 to the boundary between the first and second curved surfaces 461 and 462 and the radial distance from the central axis 9 to a radially inner end portion of each second curved surface 462). When this condition holds, an increase in the magnetic reluctance owing to a combination of the joint portion 42 and the entire through hole 46 is compensated by the protruding portion 47.

Meanwhile, if the radial dimension Da of each protruding portion 47 is too large, each of the spaces in which the coils 233 are to be provided is reduced in size. Therefore, the radial dimension Da of the protruding portion 47 is preferably equal to or less than half the radial dimension of each circular arc portion 48, for example. This preferred condition is expressed in mathematical terms as follows: $Da \leq Db/2$, where Db is the radial dimension of each circular arc portion 48. When this condition holds, a sufficiently large size of each of the spaces in which the coils 233 are to be provided is secured, while a reduction in the magnetic reluctance of the core back 41 is achieved.

Furthermore, as illustrated in FIG. 5, in the present preferred embodiment, the surface of each protruding portion 47 is preferably a curved surface having the shape of a gentle curve in a plan view. That is, each protruding portion 47 according to the present preferred embodiment does not have any angular portion where the magnetic flux cannot pass easily. Thus, the entire protruding portion 47 can be used effectively as a magnetic path. In addition, each protruding portion 47 which does not have any unwanted angular portion makes it possible to secure, on a radially inner side of the protruding portion 47, a larger space in which portions of the coils 233 adjacent thereto are to be arranged.

Figure 6:
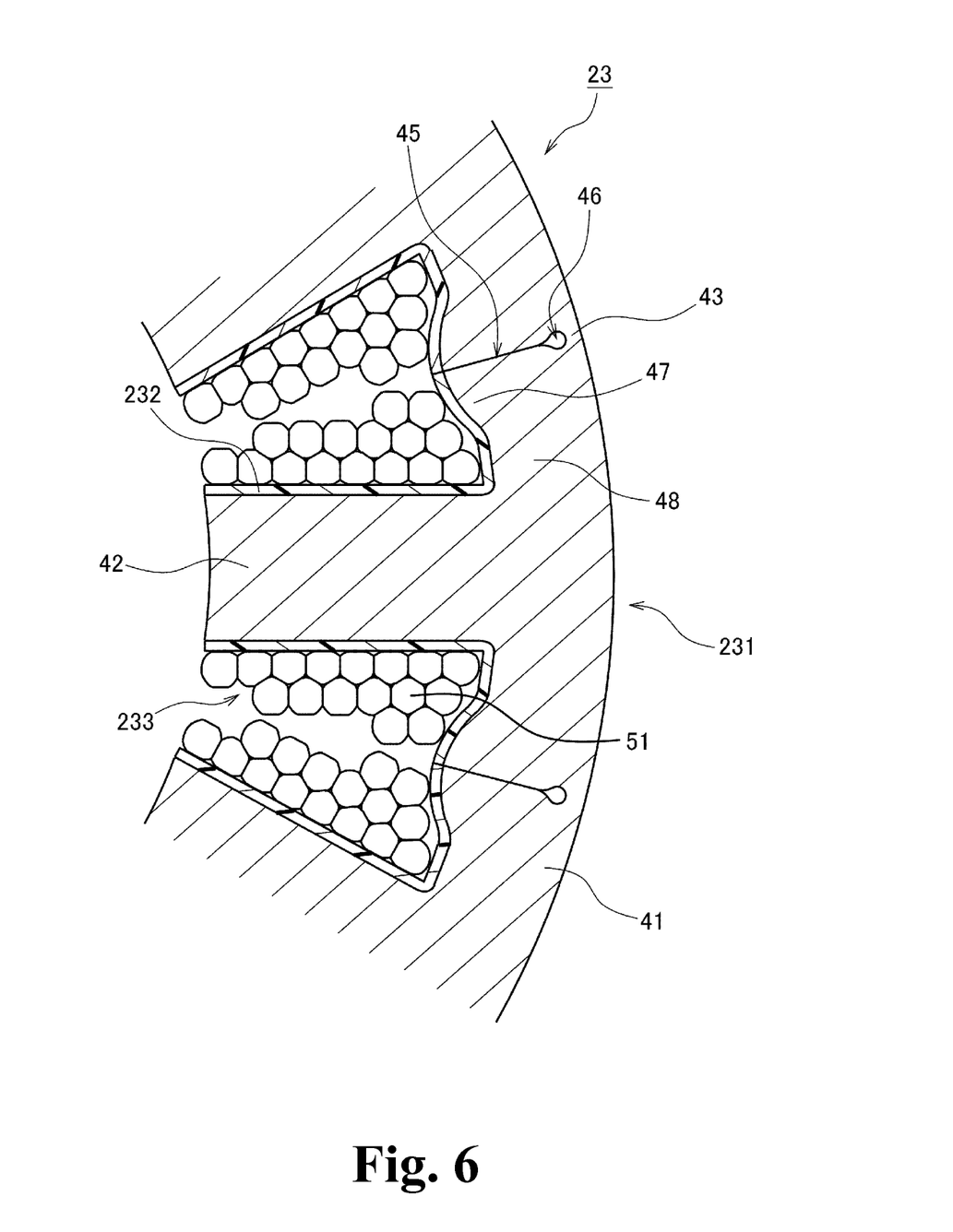
FIG. 6 is a partial horizontal cross-sectional view of a stator unit according to a preferred embodiment of the present invention.

FIG. 6 is a partial horizontal cross-sectional view of the stator unit 23, illustrating one of the teeth 42 and its vicinity. In FIG. 6, the resin bodies 234 are not shown for the sake of convenience. Each coil 233 is compressed in the circumferential direction at step S2 in a manufacturing process described below. As a result, cross-sections of turns of the conducting wire 51 are deformed at least in portions on both circumferential sides of the tooth 42 as illustrated in FIG. 6. The deformed cross-sections of the turns of the conducting wire 51 are preferably, for example, in or substantially in the shape of a hexagon or an ellipse. Gaps between adjacent turns of the conducting wire 51 in the coil 233 are reduced on both circumferential sides of the tooth 42, so that the space factor of the coil 233 is improved.

With the size of the motor 1 being the same, an increase in the space factor of each coil 233 leads to an improvement in the power of the motor 1. In addition, the increase in the space factor of each coil 233 preferably enables the power of the motor 1 to be maintained even when the size of the motor 1 is reduced. In particular, in the present preferred embodiment, each protruding portions 47 described above reduces the magnetic reluctance of the core back 41, and an additional improvement in power efficiency of the motor 1 is thus achieved. Therefore, adoption of the structure according to the present preferred embodiment leads to the motor 1 having a small size and a high power. Moreover, the increase in the space factor of each coil 233 preferably makes it possible to increase the diameter of the conducting wire 51. An increase in the diameter of the conducting wire 51 results in a reduction in resistance of the conducting wire 51 itself, which leads to an additional improvement in the power efficiency of the motor 1.

As illustrated in FIG. 6, a radially inner end portion of each of the teeth 42 according to the present preferred embodiment does not spread in the circumferential direction. That is, the circumferential width of the radially inner end portion of the tooth 42 and the circumferential width of a remaining portion of the tooth 42 are equal or substantially equal to each other. Therefore, it is preferably possible to insert each tooth 42 into the insulator 232 and the coil 233 previously arranged in an annular shape in the manufacturing process described below.

In the present preferred embodiment, a portion of each coil 233 is arranged on the radially inner side of each of the protruding portions 47 adjacent to the coil 233. That is, a portion of each coil 233 and a portion of each of the protruding portions 47 adjacent to the coil 233 are arranged to coincide with each other when viewed in the radial direction. In addition, each insulator 232 preferably includes flange portions (not labeled) each of which is arranged to extend in the circumferential direction from the vicinity of a base end portion of a corresponding one of the teeth 42 to the vicinity of a separate one of the cuts 45 adjacent thereto. Each flange portion is arranged between a corresponding one of the coils 233 and the core back 41. Moreover, a portion of each flange portion is arranged to coincide with a corresponding one of the protruding portions 47 when viewed in the radial direction.

In addition, another portion of each coil 233 is preferably arranged radially outward of the radially inner end portion of an adjacent one of the protruding portions 47. That is, a portion of each coil 233 and a portion of each of the protruding portions 47 adjacent to the coil 233 are arranged to coincide with each other when viewed in the circumferential direction. The space in which each coil 233 is arranged is thus increased in size. In the manufacturing process described below, the coil 233 previously arranged in the annular shape is attached to each insulator 232. Therefore, it is preferably easy to arrange turns of the conducting wire 51 at a position which coincides with each of the adjacent protruding portions 47 when viewed in the circumferential direction.

Furthermore, in the present preferred embodiment, the circumferential width of each coil 233 is arranged to gradually increase with increasing distance from the central axis 9 on the radially inner side of the protruding portions 47 adjacent to the coil 233. Meanwhile, the circumferential width of the coil 233 is arranged to gradually decrease with increasing distance from the central axis 9, in a space which coincides with each of the adjacent protruding portions 47 when viewed in the circumferential direction. Thus, portions of the coils 233 are arranged between each pair of adjacent ones of the teeth 42 with increased efficiency.

Preferred Embodiment for Manufacturing Stator Unit

Figure 7:
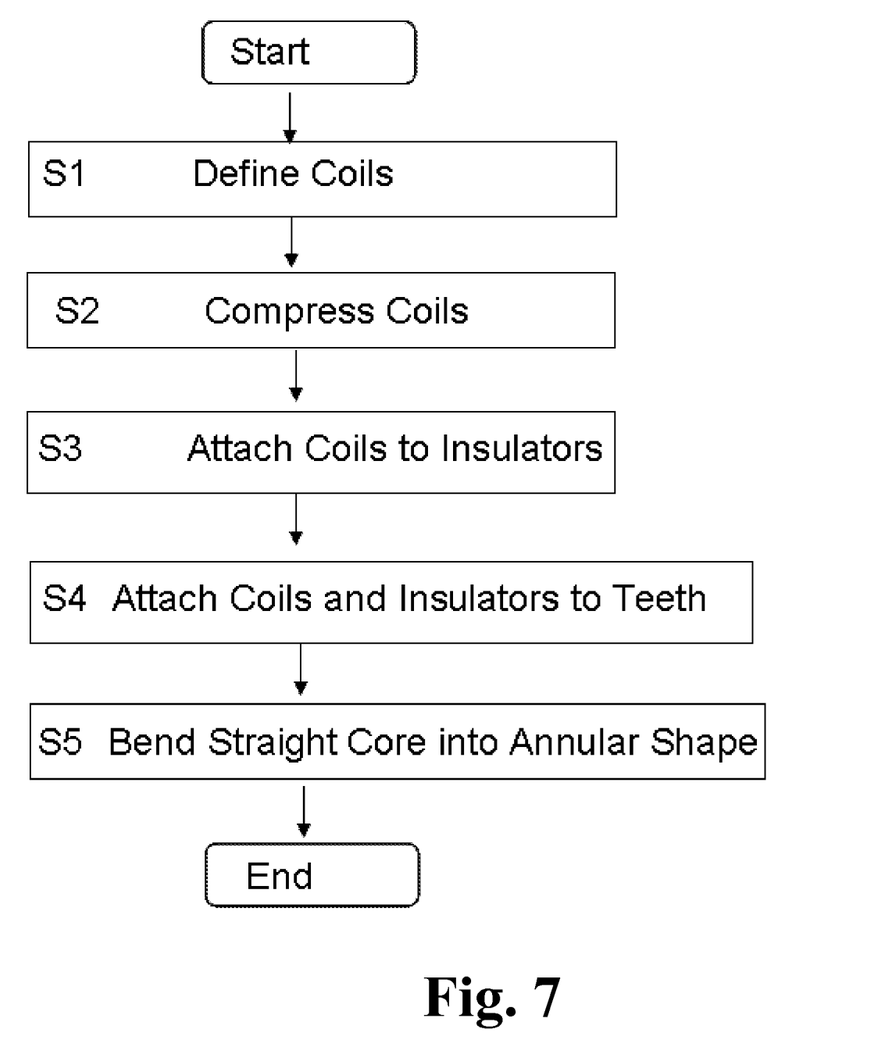
FIG. 7 is a flowchart illustrating a portion of a process of manufacturing a motor according to a preferred embodiment of the present invention.

FIG. 7 is a flowchart illustrating a portion of a process of manufacturing the above-described motor 1 in accordance with a preferred embodiment of the present invention. A procedure of manufacturing the stator unit 23 of the motor 1 will now be described below with reference to FIG. 7.

When the stator unit 23 is manufactured, a spool 50 is preferably first prepared. Then, the conducting wire 51 is wound around the spool 50 to define each coil 233 (step S1). For example, a metallic jig having a rigidity higher than that of the insulators 232 is preferably used as the spool 50. The spool 50 preferably has the same or substantially the same shape as that of a portion of the insulator 232 on which the coil 233 is attached.

Figure 8:
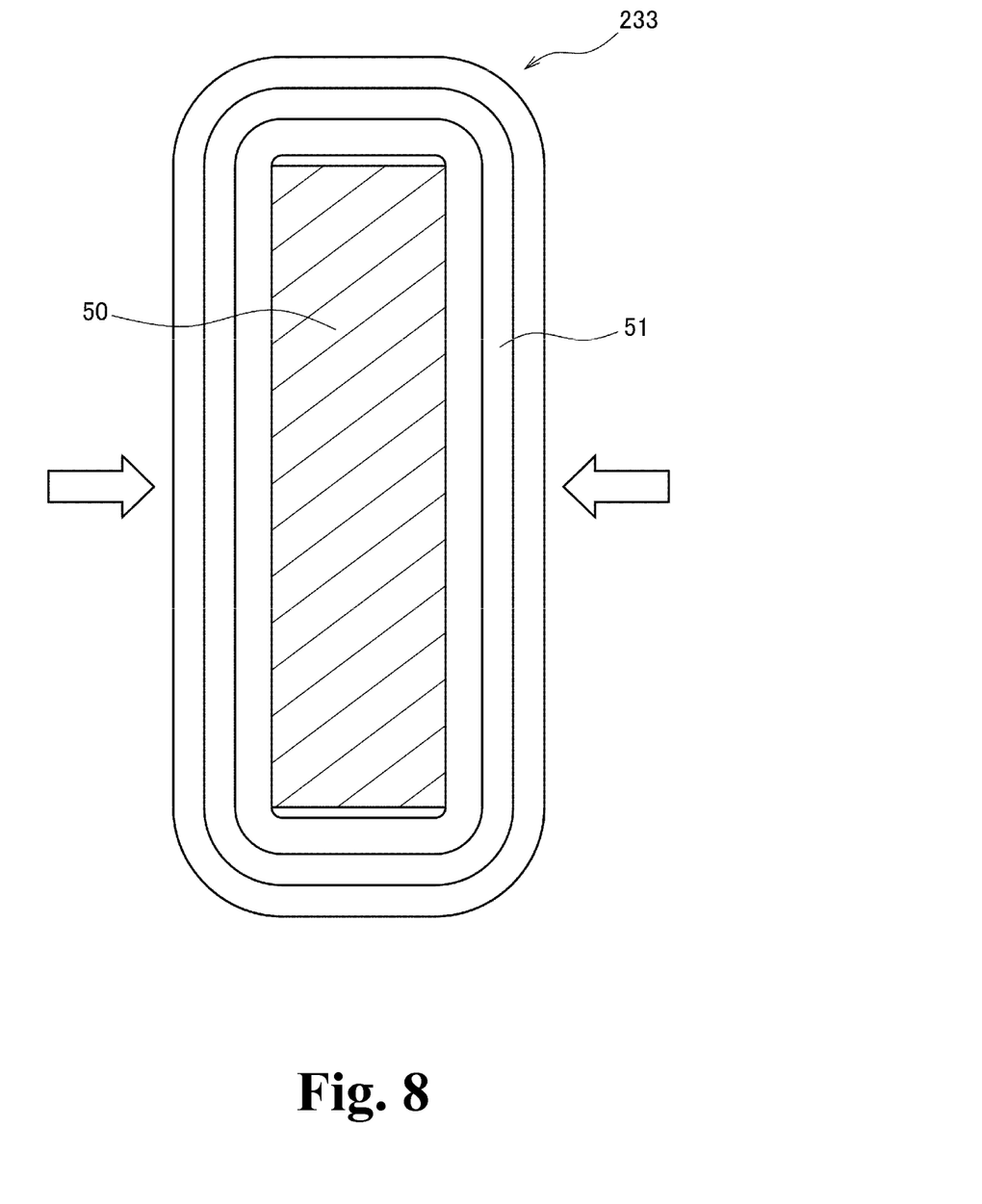
FIG. 8 is a diagram illustrating a manner in which a coil is compressed according to a preferred embodiment of the present invention.

Next, each coil 233 is preferably compressed, at least in part (step S2). FIG. 8 is a diagram illustrating a preferable manner in which the coil 233 is compressed. Here, the coil 233 is compressed in the circumferential direction as indicated by arrow outlines with blank insides in FIG. 8 so that turns of the conducting wire 51 may experience plastic deformation in a thickness direction. The gaps between adjacent turns of the conducting wire 51 in the coil 233 are thus reduced, so that the space factor of the coil 233 is improved.

Next, the coils 233 are preferably attached to the respective insulators 232 (step S3). Here, each coil 233 arranged in the annular shape is removed from the spool 50, and the insulator 232 is inserted into the coil 233. As a result, the insulator 232 holds the coil 233.

Next, the insulators 232 holding the respective coils 233 are preferably attached to the respective teeth 42 (step S4). Here, the insulators 232 are attached to the respective teeth 42 of the straight core 4 in the expanded state as illustrated in FIG. 4. A tip portion of each tooth 42 is preferably not arranged to spread in the circumferential direction. Therefore, it is easy to insert the tooth 42 into the coil 233 and the insulator 232.

In step S4, the insulators 232 and the coils 233 are attached to all the teeth 42 of the straight core 4. Thereafter, each joint portion 43 is preferably deformed to bend the core back 41 into the annular shape (step S5). As a result, the stator unit 23 having the annular shape is obtained.

Modifications of Preferred Embodiments

While preferred embodiments of the present invention have been described above, it will be understood that the present invention is not limited to the above-described preferred embodiments.

Attachment of the coil to the insulator may be performed either before or after attachment of the insulator to the tooth. For example, the coil may be attached to the insulator after the insulator is attached to the tooth.

Each of the protruding portions may be arranged either to have a convex shape projecting radially inward as in the above-described preferred embodiment, or to have another shape. For example, the surface of each protruding portion may be a curved surface having a concave shape with a radius of curvature greater than that of the other portions of the inner circumferential surface of the core back, or may be a flat surface, as long as a local increase in the radial dimension of the core back is achieved by the shape of the surface of the protruding portion.

The end surfaces of the adjacent core pieces may either be arranged to be in contact with each other at the cut, or be arranged opposite to each other with a slight gap therebetween at the cut. Also, the through hole arranged at the radially outer end portion of each cut may either be defined by curved surfaces each of which is in the shape of a circular arc as in the above-described preferred embodiment, or be arranged to have another shape. For example, the through hole may be arranged to have the shape of an ellipse or a rhombus in a plan view.

Also, the circumferential width of each tooth may either be constant or substantially constant along its entire length as in the above-described preferred embodiment, or be decreased in the radially inner end portion of the tooth. That is, the circumferential width of the radially inner end portion of the tooth may be smaller than the circumferential width of the remaining portion of the tooth.

Also, the outer circumferential surface of the core back bent into the annular shape may be arranged to have either a circular shape or a polygonal shape in a plan view. Also, the insulator attached to each tooth may be defined either by a single member or by two or more members.

Note that the detailed shape of any member may be different from the shape thereof as illustrated in the accompanying drawings of the present application. Also note that features of the above-described preferred embodiments and the modifications thereof may be combined appropriately as long as no conflict arises.

The preferred embodiments of the present invention and modifications thereof are applicable to motors and methods of manufacturing the motors.

While preferred embodiments of the present invention and modifications thereof have been described above, it is to be understood that variations and additional modifications will be apparent to those skilled in the art without departing from the scope and spirit of the present invention. The scope of the present invention, therefore, is to be determined solely by the following claims.

The invention claimed is:

1. A motor comprising:
   a stationary portion; and
   a rotating portion supported to be rotatable about a central axis with respect to the stationary portion; wherein
   the stationary portion includes:
      a stator core including a core back having an annular shape, and a plurality of teeth extending radially inward from the core back;
      insulators, each of which is attached to a separate one of the teeth; and
      coils, each of which is defined by a conducting wire wound around a separate one of the insulators;
   a radially inner end portion of each tooth is arranged to have a circumferential width substantially equal to or smaller than a circumferential width of a remaining portion of the tooth;
   the core back includes, between adjacent ones of the teeth:
      a protruding portion that protrudes radially inward;
      a cut that extends radially outward from the protruding portion; and
      a through hole that extends in an axial direction through the core back, and is defined at a radially outer end portion of the cut;
   the protruding portion is arranged to locally increase a radial dimension of the core back;
   the core back includes circular or substantially circular arc portions, each of which is arranged between the protruding portion and a separate one of the teeth adjacent to the protruding portion;
   an inner circumferential surface of the through hole includes:
      a first curved surface having a center of curvature in the through hole; and
      a second curved surface arranged radially inward of the first curved surface, and having a center of curvature outside of the through hole;
   the core back includes a circumferentially continuous joint portion arranged on a radially outer side of the through hole; and $Dc+Dd \leq Da \leq Db/2$ where Da is a radial dimension of the protruding portion, Db is a radial dimension of the circular arc portion, Dc is a radial dimension of the first curved surface Dd, and is a radial dimension of the joint portion.

2. The motor according to claim 1, wherein
   the core back includes circular arc portions, each of which is arranged between the protruding portion and a separate one of the teeth adjacent to the protruding portion; and
   a portion of the core back which coincides with the through hole when viewed in a radial direction has a total radial dimension equal to or greater than a radial dimension of the circular arc portion, and the total radial dimension does not include a radial dimension of the through hole.

3. The motor according to claim 1, wherein $Dc \leq Da \leq Db/2$.

4. The motor according to claim 1, wherein $Dc+Dd+De \leq Da \leq Db/2$ where De is a radial dimension of the second curved surface.

5. The motor according to claim 1, wherein
   the protruding portion has a convex shape;
   a portion of the protruding portion is arranged to coincide with at least a portion of each of the coils adjacent to the protruding portion when viewed in a radial direction; and
   the protruding portion is arranged to coincide with at least a portion of each of the coils adjacent to the protruding portion when viewed in a circumferential direction.

6. The motor according to claim 2, wherein
   the protruding portion has a convex shape;
   a portion of the protruding portion is arranged to coincide with at least a portion of each of the coils adjacent to the protruding portion when viewed in the radial direction; and
   the protruding portion is arranged to coincide with at least a portion of each of the coils adjacent to the protruding portion when viewed in a circumferential direction.

7. The motor according to claim 3, wherein
   the protruding portion has a convex shape;
   a portion of the protruding portion is arranged to coincide with at least a portion of each of the coils adjacent to the protruding portion when viewed in a radial direction; and
   the protruding portion is arranged to coincide with at least a portion of each of the coils adjacent to the protruding portion when viewed in a circumferential direction.

8. The motor according to claim 4, wherein
   the protruding portion has a convex shape;
   a portion of the protruding portion is arranged to coincide with at least a portion of each of the coils adjacent to the protruding portion when viewed in a radial direction; and
   the protruding portion is arranged to coincide with at least a portion of each of the coils adjacent to the protruding portion when viewed in a circumferential direction.

9. The motor according to claim 5, wherein
   a circumferential width of a portion of each of the coils which is located radially inward of the protruding portion is arranged to gradually decrease with decreasing distance from the central axis; and
   a circumferential width of a portion of each of the coils which coincides with the protruding portion when viewed in the circumferential direction is arranged to gradually decrease with increasing distance from the central axis.

10. The motor according to claim 6, wherein
    a circumferential width of a portion of each of the coils which is located radially inward of the protruding portion is arranged to gradually decrease with decreasing distance from the central axis; and
a circumferential width of a portion of each of the coils which coincides with the protruding portion when viewed in the circumferential direction is arranged to gradually decrease with increasing distance from the central axis.

11. The motor according to claim 7, wherein
a circumferential width of a portion of each of the coils which is located radially inward of the protruding portion is arranged to gradually decrease with decreasing distance from the central axis; and
a circumferential width of a portion of each of the coils which coincides with the protruding portion when viewed in the circumferential direction is arranged to gradually decrease with increasing distance from the central axis.

12. The motor according to claim 8, wherein
a circumferential width of a portion of each of the coils which is located radially inward of the protruding portion is arranged to gradually decrease with decreasing distance from the central axis; and
a circumferential width of a portion of each of the coils which coincides with the protruding portion when viewed in the circumferential direction is arranged to gradually decrease with increasing distance from the central axis.

13. The motor according to claim 12, wherein a surface of the protruding portion is a curved surface.

14. The motor according to claim 9, wherein at least some turns of the conducting wire are arranged to have hexagonal cross-sections on circumferential sides of each of the teeth.

15. The motor according to claim 13, wherein at least some turns of the conducting wire are arranged to have hexagonal cross-sections on circumferential sides of each of the teeth.

16. A method of manufacturing the motor of claim 1, the method comprising the steps of:
a) winding the conducting wire around a spool to define each coil;
b) attaching each coil and each insulator to a corresponding one of the teeth; and
c) bending the core back into the annular shape.

17. A method of manufacturing the motor of claim 15, the method comprising the steps of:
a) winding the conducting wire around a spool to define each coil;
b) attaching each coil and each insulator to a corresponding one of the teeth; and
c) bending the core back into the annular shape; wherein
in step a), the conducting wire is wound around the spool to assume a shape of a coil, the spool being made of a metal, and thereafter the conducting wire in the shape of the coil is compressed in the circumferential direction to experience plastic deformation in a thickness direction to obtain each coil.

* * * * *